(12) United States Patent
Papavasiliou et al.

(10) Patent No.: US 8,818,889 B2
(45) Date of Patent: Aug. 26, 2014

(54) TECHNIQUE FOR AGGREGATING AN ENERGY SERVICE

(75) Inventors: Anthony Papavasiliou, Berkeley, CA (US); Haitham Ali Salem Hindi, Menlo Park, CA (US); Daniel H. Greene, Sunnyvale, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1079 days.

(21) Appl. No.: 12/406,003

(22) Filed: Mar. 17, 2009

(65) Prior Publication Data

US 2010/0241549 A1 Sep. 23, 2010

(51) Int. Cl.
*G06Q 50/00* (2012.01)
(52) U.S. Cl.
CPC ...................................... *G06Q 50/00* (2013.01)
USPC .......................................................... 705/37
(58) Field of Classification Search
CPC ...................................................... G06Q 50/00
See application file for complete search history.

(56) References Cited

U.S. PATENT DOCUMENTS

| | | | | |
|---|---|---|---|---|
| 6,047,274 | A * | 4/2000 | Johnson et al. | 705/412 |
| 6,618,709 | B1 * | 9/2003 | Sneeringer | 705/412 |
| 7,013,290 | B2 * | 3/2006 | Ananian | 705/26.42 |
| 7,315,835 | B1 * | 1/2008 | Takayasu et al. | 705/35 |
| 7,343,360 | B1 * | 3/2008 | Ristanovic et al. | 705/412 |
| 7,409,360 | B1 * | 8/2008 | Lark et al. | 705/26.3 |
| 7,474,995 | B2 * | 1/2009 | Masiello et al. | 703/2 |
| 8,452,661 | B2 * | 5/2013 | Karch et al. | 705/16 |
| 2003/0014342 | A1 * | 1/2003 | Vande Pol | 705/36 |
| 2003/0055776 | A1 * | 3/2003 | Samuelson | 705/37 |
| 2003/0069774 | A1 * | 4/2003 | Hoffman et al. | 705/8 |
| 2004/0215529 | A1 * | 10/2004 | Foster et al. | 705/26 |
| 2009/0228324 | A1 * | 9/2009 | Ambrosio et al. | 705/10 |
| 2009/0319415 | A1 * | 12/2009 | Stoilov et al. | 705/37 |
| 2010/0217550 | A1 * | 8/2010 | Crabtree et al. | 702/62 |

* cited by examiner

*Primary Examiner* — Bruce I Ebersman
(74) *Attorney, Agent, or Firm* — Shun Yao; Park, Vaughan, Fleming & Dowler LLP

(57) ABSTRACT

Embodiments of a system, a method, and a computer-program product (e.g., software) for aggregating an energy service from a number of participants for use by a power-system operator is described. This aggregation may be performed by an aggregator, which is between the participants and the power-system operator. In particular, the aggregator may use an embedded economic mechanism to calculate a price that matches supply (or cutback) of power and/or load from the participants with a desired supply of the power-system operator. Because the aggregator typically does not know the participants' exact propensity to respond as a function of price (supply function), the aggregator calculates the purchase price using one or more iterations in which an initial probe price is provided to the participants, and the participants respond with supply-function approximations that are valid in proximity to the current probe price.

23 Claims, 5 Drawing Sheets

TECHNIQUE FOR AGGREGATING AN ENERGY SERVICE

BACKGROUND

1. Field

The present disclosure relates to techniques for aggregating one or more participants in a power system in order to provide an energy service. More specifically, the present disclosure relates to exchanging price points and approximations to supply functions that facilitate aggregation of the one or more participants in order to provide the energy service.

2. Related Art

In traditional electricity markets, economic mechanisms are frequently used to arrive at accurate incentives and to dispatch services. For example, an operator of a power system, such as an independent system operator (ISO), may request bids up to 24 hours in advance of a desired service. In response to the request, one or more suppliers, such as a power plant, may bid to supply power or ancillary services (such as regulation, load following, spinning reserve, non-spinning reserve, replacement reserve and/or other services that help maintain power system stability in response to unanticipated variations in the supply and demand of electricity). Based on the received bids, the ISO may select or dispatch the services it needs to operate the power system or grid. In the case of contingency services (e.g., spinning reserve), the ISO may dispatch the services and compensate the corresponding suppliers for being available, even if these suppliers are not subsequently required to provide power.

With the deregulation of electricity markets, and the increased integration of communication and control technology in power systems, it is increasingly attractive for flexible electricity consumers (such as individual residences, as well as small and medium-sized businesses, which are henceforth collectively referred to as 'participants') to supply energy services to an ISO. For example, residential consumers of electricity can, in principle, provide ancillary services by shifting their consumption of electricity relative to their baseline consumption patterns. Because of the small size of the these residences and small businesses, typically aggregators in the power system likely want to combine and coordinate the supply and/or demand of multiple participants in order to aggregate sufficient energy service to meet the needs of the ISO.

However, the participants may not be able to offer the same quality of service that an aggregator needs to provide to the ISO. Furthermore, the participants may not wish to be exposed the full risks of trading a volatile energy spot market. As a consequence, it may not be practical for the participants to interact with an aggregator using the same mechanism that the aggregator uses to interact with the ISO. For example, it may not be reasonable to expect that a participant bid up to 24 hours in advance of a desired service, such as a power reduction or being on standby for power reduction (which is the demand side equivalent to spinning reserve). Typically, residential customers or small businesses are not able to predict their load 24 hours in advance. Consequently, they may not be willing to commit to a future reduction with high reliability.

In addition to the increased risk associated with the different time scales between when an ISO requests bids and when participants may be willing to offer changes in supply or demand, it may be difficult to optimize the decisions of the aggregator and the distributed participants. For example, participants may need to balance the impact of reduced demand with the commensurate economic reward. Similarly, the aggregator may need to balance the price offered by the ISO for a desired service versus the fees paid to the participants. However, it can be difficult for the aggregator and the participants to perform these optimizations without information about the consequences of their decisions for counterparties.

An economic mechanism, such as a market or an exchange, can simplify the interaction between the aggregator and the participants. For example, using a price setting or auction mechanism, a locally stable price and supply can be identified. However, economic mechanisms often have poor convergence properties. For example, even though a distributed economic mechanism may (ultimately) arrive at a good or optimal equilibrium solution, this process can be time consuming and may involve oscillations that can degrade the operation and performance of the power system.

Hence, what is needed is a method and a system that facilitates aggregation of the energy service without the problems listed above.

SUMMARY

One embodiment of the present disclosure provides a system to aggregate an energy service from a number of participants for use by a power-system operator. During operation, the system provides a probe price for the energy service to a participant. Then, the system receives a supply-function approximation from the participant, where the supply-function approximation corresponds to a supply function in proximity to the probe price, and the supply-function approximation is other than a single-point approximation. Note that the supply function indicates a relation between the supply and price of the energy service. Next, the system calculates a purchase price with respect to the participant for the energy service the participant can provide based at least in part on the received supply-function approximation, where the aggregated amount of energy service purchased from the participants at their respective purchase prices approximately equals a desired amount of the energy service. The system may determine a larger target desired amount of energy service, and calculate a purchase price, in order to make some allowance for uncertainty in the response of participants.

If the purchase price is not consistent (for example, it is far enough away from to the probe price that the supply-function approximations may be inaccurate), then the operations of updating the probe price, receiving the supply-function approximation, and re-calculating the purchase price may be iteratively repeated until the purchase price is near enough to the probe price and a stable value is reached.

Note that the purchase price may be a minimum price in a range of prices. Moreover, the energy service may include: a demand response in which the participants agree to reduce energy demand, a commitment by the participants to provide power, and/or a commitment by participants to provide ancillary power services.

A wide variety of information and formats may be included in the supply-function approximation. For example, the supply-function approximation may include a tangent to the supply function of the participant at the probe price. Alternatively or additionally, the supply-function approximation may include a difference equation, a differential equation and/or a finite state machine. In some embodiments, the supply-function approximation is selected from a set of predetermined functions. Furthermore, in some embodiments the supply-function approximation is a vector that includes a series of supply-function approximations and associated prices that facilitate calculation of purchase prices in a sequence of time intervals.

In some embodiments, calculating the purchase price involves performing Newton's method. Moreover, after the calculation, the purchase price may be fixed for the participant, who is obliged to provide a corresponding portion of the desired amount of the energy service. One or more of the participants may help specify such conditions. Therefore, the supply-function approximation may include a restriction on a binding responsibility of the participant.

In some embodiments, the system provides a bid to the power-system operator to provide the desired amount of energy service at a contracted time in the future. Furthermore, the operations of providing the probe price, receiving the supply-function approximation, and calculating the purchase price may occur after the bid and before the contracted time. Additionally, the system may couple the energy service with other power sources and/or other power loads.

By aggregating the energy service, the power-system operator may be able to perform regulation and/or load following in the power system. For example, the regulation may occur over a time interval that is less than 15 seconds and/or the load following may occur over a time interval that is less than one minute.

In some embodiments, the system includes a computer system.

Another embodiment provides a method including at least some of the above-described operations.

Another embodiment provides a computer-program product for use in conjunction with the computer system.

BRIEF DESCRIPTION OF THE FIGURES

Note that like reference numerals refer to corresponding parts throughout the drawings.

DETAILED DESCRIPTION

Figure 1:
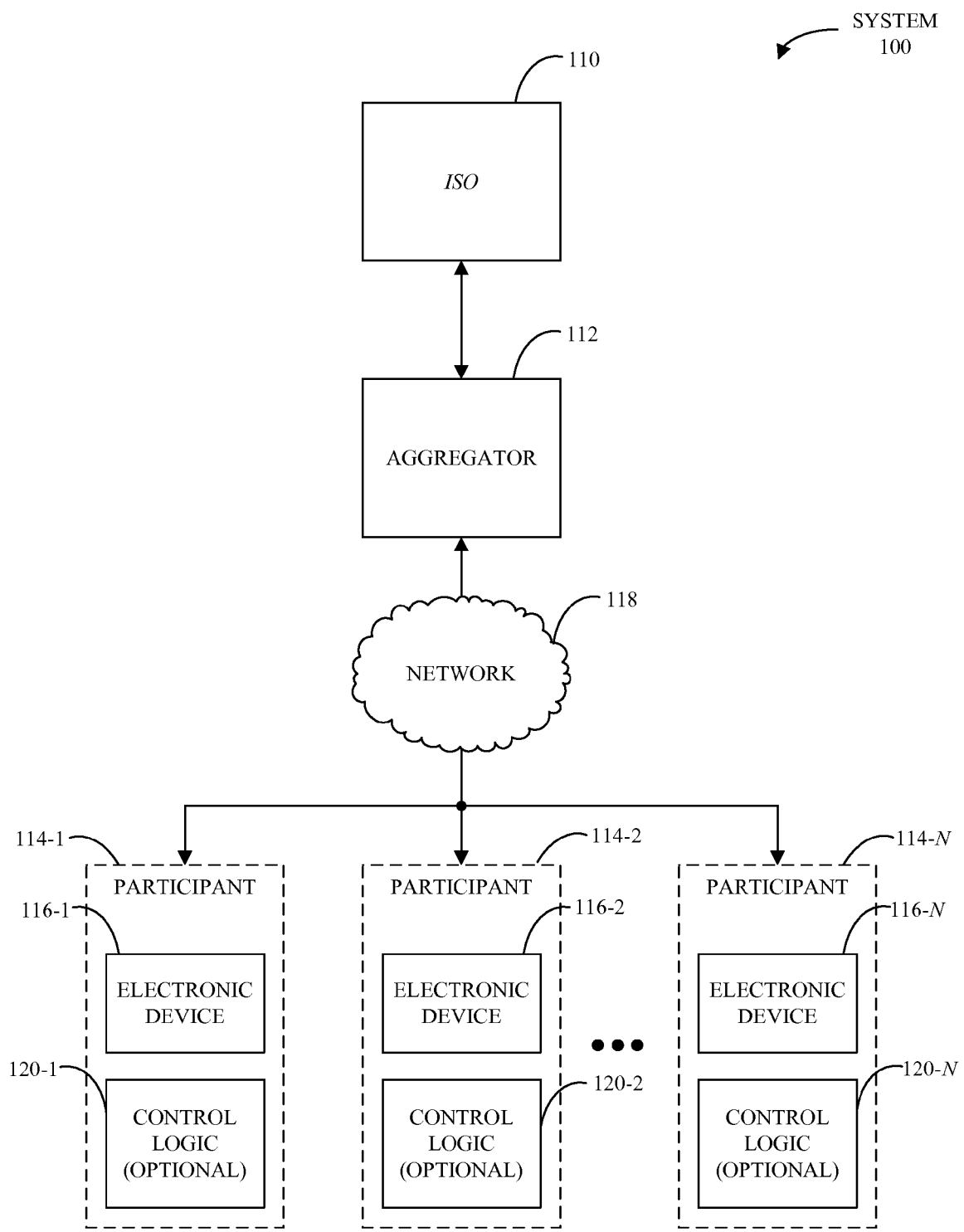
FIG. 1 is a block diagram illustrating a system in accordance with an embodiment of the present disclosure.

The following description is presented to enable any person skilled in the art to make and use the disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not intended to be limited to the embodiments shown, but is to be accorded the widest scope consistent with the principles and features disclosed herein.

Embodiments of a system, a method, and a computer-program product (e.g., software) for aggregating an energy service from a number of participants for use by a power-system operator is described. This aggregation may be performed by an aggregator, which is between the participants and the power-system operator. In particular, the aggregator may use an embedded economic mechanism to calculate a price that matches supply (or cutback) of power and/or load from the participants with a desired supply of the power-system operator. Because the aggregator typically does not know the participants' exact propensity to respond as a function of price (supply function), the aggregator calculates the purchase price using one or more iterations in which an initial probe price is provided to the participants, and the participants respond with supply-function approximations that are valid in proximity to the current probe price.

By aggregating the energy service, this aggregation technique can facilitate increased economy of scale (such as that offered by larger energy providers) and improved quality or reliability (e.g., the ability to provide the desired amount of the energy service to the power-system operator). Furthermore, this aggregation technique may allow the purchase price to be determined rapidly, thereby improving power-system performance. Note that by exchanging supply-function approximations, this aggregation technique may efficiently utilize hardware and/or may be compatible with constraints on communication between the aggregator and the participants.

In the discussion that follows, 'energy services' refers broadly to: a demand response in which at least some of the participants agree to reduce their energy demand, the generation of power by at least some of the participants, and/or ancillary services that include load, supply or both. Moreover, values of supply or load can be positive or negative. Note that negative demand response (i.e., a decrease in demand) is equivalent to positive power generation. Similarly, positive demand response (i.e., an increase in demand) is equivalent to negative power generation.

We now discuss embodiments of a technique for aggregating an energy service. In a power system, an ISO may use energy services to dynamically match overall supply and load. Typically, an ISO predicts the energy load, and uses optimizations and market mechanisms to arrange the required primary and ancillary services to successfully operate the power system.

In existing approaches, the providers of energy services are often large power plants or, for demand response, large industrial loads. However, with the advent of small renewable resources, and the possibility that participants (such as homes and small businesses) can provide power and/or demand response, there is an opportunity to aggregate small and typically low-quality energy services from multiple participants into larger and better quality energy services for the power system. As shown in FIG. 1, which presents a block diagram illustrating a system 100, this aggregation can be implemented by an aggregator 112, who may be a utility company or a third party. Moreover, aggregator 112 may reside at one or more locations in system 100 (thus, the function of aggregator 112 may be distributed in system 100). As described further below, in some embodiments, information that is used by aggregator 112 is collected or received using electronic devices 116 that are distributed at the locations of participants 114.

After the energy service is aggregated, aggregator 112 may: sell it directly to ISO 110, couple it with other sources (such as wind) to improve the overall value in the power system, and/or combine it with other loads to reduce the overall cost. Furthermore, the aggregated energy service may allow ISO 110 to perform regulation and/or load following in the power system. For example, the regulation may occur over a time interval that is less than 15 seconds and/or the load following may occur over a time interval that is less than one minute.

However, there can be problems associated with aggregating low-quality energy services to provide high-quality energy services. In particular, it can be difficult and expensive to rapidly and accurately select (or dispatch) low-quality energy services to create high-quality aggregate energy services.

To address this problem, a fast-acting and accurate embedded economic mechanism is used to help mediate between aggregator 112 and participants 114. In particular, in an iterative aggregation technique, aggregator 112 may provide an initial probe price to participants 114, for example, via a network 118 (such as the Internet) and electronic devices 116. In response, a given participant (such as participant 114-1) may provide an approximation to a supply function (which is sometimes referred to as a 'supply-function approximation'). For example, the supply function may include a relation between the supply (or demand) as a function of the price of the energy service, and a given supply-function approximation may approximate the overall supply function in proximity to the probe price. Using the supply-function approximations from participants 114, aggregator 112 can calculate a purchase price necessary to aggregate and provide the desired energy service for ISO 110. Moreover, by exchanging information in this way, aggregator 112 and at least a subset of participants 114 may rapidly converge on a solution. Consequently, this aggregation technique may facilitate improved aggregate energy services and better performance of the power system.

Note that this aggregation technique allows aggregator 112 and participants 114 to independently optimize their responses to define an aggregate energy service. Specifically, the aggregator can optimize the price while the participants focus on minimizing their tradeoff between disutility and revenue. For example, in the case where the aggregate energy service is a demand response, participants 114 can optimize their responses based at least in part on any disutility (such as temperature deviation from set point in their homes as a function of supply) they have for the demand response versus the economic rewards they expect to derive from the demand response. (Note that when the participants respond with supply that optimizes the tradeoff between their individual disutility and revenue, then the supply function may be derived directly from the disutility function.) On the other side, aggregator 112 can optimize the total amount of demand response and the associated cost based at least in part on its own management of the risks and rewards of the aggregate energy service. Aggregator 112 does not need to explicitly know or optimize the disutility of participants 114, and conversely, participants 114 do not need to worry about delivering the aggregate energy service. Consequently, in addition to determining the amount and the price, the embedded economic mechanism may simplify the interaction between aggregator 112 and participants 114 (and, thus, the architecture of system 100).

In general, in different embodiments the supply-function approximations may include a variety of information and formats. For example, the given supply-function approximation may include a slope or a tangent to a supply function of the corresponding participant at the probe price. Alternatively or additionally, the supply-function approximations may include: difference equations, differential equations and/or finite state machines.

In some embodiments, participants 114 select current supply-function approximations from a set of predetermined functions. For example, electronic devices 116 at participant locations may include buttons or icons on a display corresponding to the predetermined functions, and participants 114 may select current supply-function approximations by pressing the buttons or activating the icons. Then, electronic devices 116 may communicate the selected current supply-function approximations to aggregator 112 using network 118.

Note that a given electronic device, such as electronic device 116-1, may include a centralized device and/or a distributed device at the corresponding participant location. Consequently, in some embodiments, electronic devices 116 communicate with and collect information (such as power consumption and/or the disutility caused by the demand response or a reduction in power consumption) from appliances and electrical equipment at the participant locations. This information may be used by optional control logic 120 to select current supply-function approximations for participants 114. Participants 114 may update instructions to optional control logic 120, periodically or as needed, so that optional control logic 120 appropriately balances the disutility versus the reward for participants 114.

Once a final purchase price is calculated for a current time interval, there may be a binding agreement between aggregator 112 and at least the subset of participants 114, each of whom agrees to provide at least a portion of the aggregate energy service. This binding agreement may include restrictions or responsibilities on subsequent actions of participants in at least the subset. Thus, these participants may be obliged to adjust their demand response in exchange for compensation at the fixed final purchase price. In order to provide information which can be used to specify the restrictions or responsibilities and/or to identify at least the subset, the supply-function approximations provided by one or more of participants 114 may include limitations on the restrictions or responsibilities. For example, a participant may restrict the domain of prices for which the supply-function approximation is acceptable.

While the preceding discussion has used an exchange of information (such as one or more iterations of exchanging the probe price and the supply-function approximations) to aggregate an energy service during a time interval, in other embodiments the exchanged information allows determination of aggregate energy services in a sequence of time intervals. Thus, the supply-function approximations may each be a vector that includes a series of supply-function approximations and associated prices.

Figure 2:
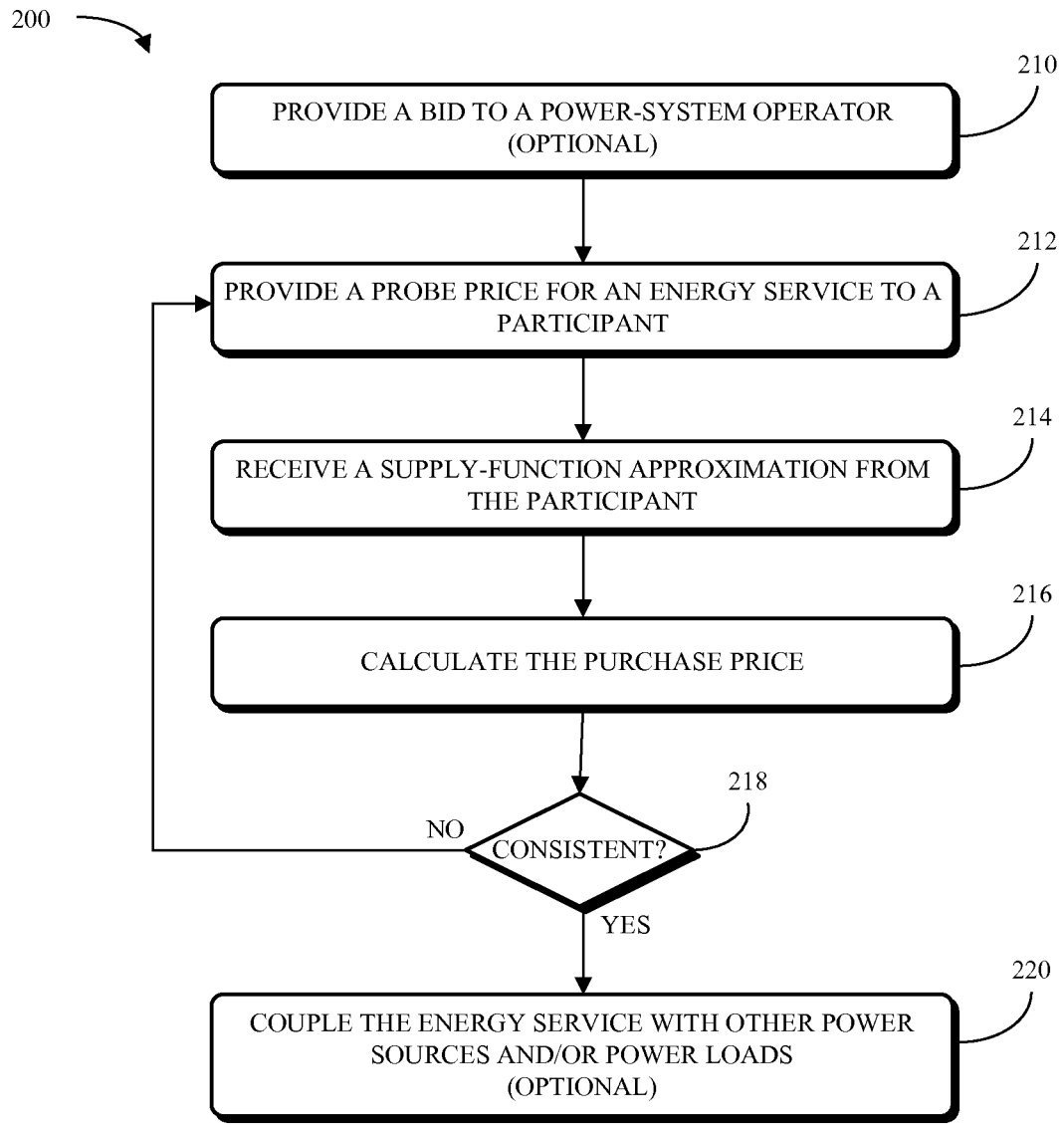
FIG. 2 is a flow chart illustrating a process for aggregating an energy service in accordance with an embodiment of the present disclosure.

FIG. 2 presents a flow chart illustrating a process 200 for aggregating an energy service, which may be performed by a computer system (for example, a computer system that is operated by aggregator 112 in FIG. 1). During operation, the system provides an initial probe price for an energy service to a participant (212). Then, the system receives a supply-function approximation from the participant (214), where the supply-function approximation corresponds to a supply function in proximity to the initial probe price, and the supply-function approximation is other than a single-point approximation. Note that the supply function indicates a relation between the supply and price of the energy service. Next, the system calculates a purchase price with respect to the participant for the energy service the participant can provide based at least in part on the received supply-function approximation (216), where the aggregated amount of energy service purchased from the participants at their calculated purchase prices approximately equals a desired amount of the energy service.

If the purchase price is not consistent with the probe price (218) (for example, if it is not approximately equal to the probe price), the operations of providing the probe price (212) (i.e., upgrading the probe price), receiving the supply-function approximation (214), and re-calculating the purchase price (216) may be iteratively repeated until the purchase price converges to a stable value. Determining if the purchase price is consistent can include determining that the purchase price is near enough to the probe price, and/or determining that the purchase price meets the restrictions participants included with their supply-function approximations. Note that the purchase price may be a minimum price in a range of prices.

In some embodiments, the computer system optionally provides a bid to the power-system operator to provide the desired amount of energy service at a contracted future time (210). (Thus, in these embodiments, the desired energy service for ISO 110 in FIG. 1 may be known in advance by aggregator 112 in FIG. 1. However, in other embodiments the desired energy service for ISO 110 in FIG. 1 is not known in advance.) Furthermore, the operations of providing the probe price (212), receiving the supply-function approximations (214), and calculating the subsequent price (216) may occur after the bid and before the contracted time. For example, aggregator 112 (FIG. 1) may bid 24 hours in advance to provide an ancillary service to ISO 110 (FIG. 1). Then, aggregator 112 (FIG. 1) may use a shorter-term and faster-acting embedded economic mechanism to solicit bids from participants 114 (FIG. 1) closer to the time the desired energy service is required. Therefore, aggregator 112 (FIG. 1) may manage the risk of any mismatch between the price agreed in advance with ISO 110 (FIG. 1) and the price necessary to elicit the demand response from at least the subset of participants 114 (FIG. 1).

Additionally, once the system has settled its transactions with the participants, the system may optionally couple the energy service with other power sources (such as wind) and/or other power loads (220).

Note that process 200 may include additional or fewer operations. Moreover, the order of the operations may be changed and/or two or more operations may be combined into a single operation.

In an exemplary embodiment, the desired energy service is a demand response, and for simplicity we assume that aggregator 112 (FIG. 1) wants to elicit an immediate demand reduction. Aggregator 112 (FIG. 1) may set an initial probe price that he estimates will elicit the correct aggregate supply. In response, each of participants 114 (FIG. 1) may provide supply-function approximations proximate to this initial probe price that specify the amount of demand response that participants 114 (FIG. 1) will deliver for this price. Then, aggregator 112 (FIG. 1) may calculate an updated purchase price based at least in part on the supply-function approximations received from participants 114 (FIG. 1). If the total demand reduction meets the needs of aggregator 112 (FIG. 1), and is consistent with the supply-function approximations of a subset of participants, then the updated price becomes the settlement or purchase price that is used to settle the purchase of the demand reduction from at least a subset of participants 114 (FIG. 1). Otherwise, aggregator 112 (FIG. 1) may suggest a new estimated probe price to participants 114 (FIG. 1), and the process may be optionally iteratively repeated one or more times until aggregator 112 (FIG. 1) obtains a suitable price.

Note that the supply-function approximations allow aggregator 112 (FIG. 1) to quickly calculate the settlement price that will elicit the required supply from at least the subset of participants 114 (FIG. 1). In particular, the supply-function approximations inform aggregator 112 (FIG. 1) how each participant will respond to a variety of prices (with the highest accuracy near the initial estimated price). Consequently, aggregator 112 (FIG. 1) can calculate the lowest price that will elicit the required supply using a small number of iterations and without (or with reduced) oscillations.

Because of inaccuracies in the supply-function approximations, there may be small errors in the delivered supply at the settlement price. In this case, the proposed embedded economic mechanism may be used to dispatch supply for a time interval (e.g., a time interval that has a duration between 4 seconds and 10 minutes). During subsequent time intervals, participants 114 (FIG. 1) may be free to adjust their supply-function approximations.

Note that the supply-function approximations may optionally include restrictions on their domain of binding response, particularly for prices that are far away from the initial proposed price. If aggregator 112 (FIG. 1) calculates an updated price that is not in the domain of binding response for a given participant, then process 200 (FIG. 2) may be iterated with a better proposed price until at least the subset of participants 114 (FIG. 1) are satisfied with the accuracy of their supply-function approximations, and are willing to accept the resulting settlement price as binding.

Figure 3:
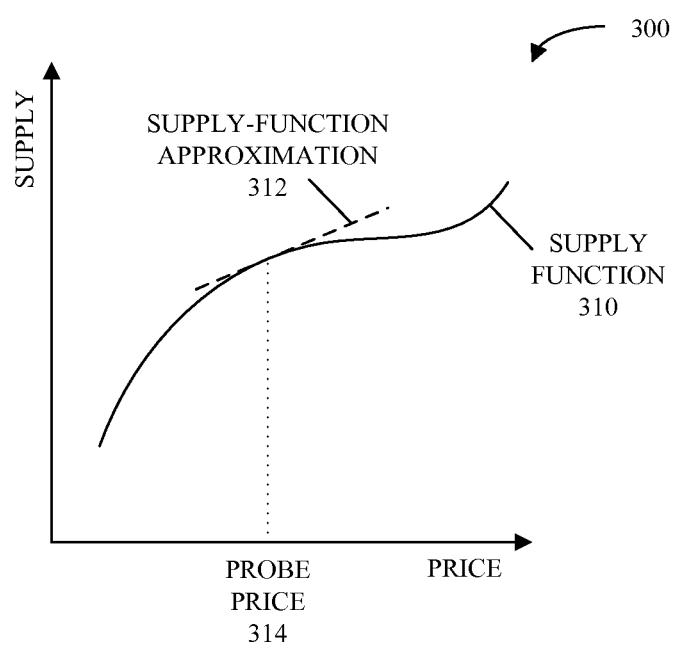
FIG. 3 is a graph of a supply function and a supply-function approximation in accordance with an embodiment of the present disclosure.

In some embodiments, the supply-function approximations are linear functions tangent to their supply function at the initial proposed price, and hence the supply function approximations can be parameterized by a slope and an intercept. This is shown in FIG. 3, which presents a graph 300 of a supply function 310 and a supply-function approximation 312 proximate to a probe price 314 provided by aggregator 112 (FIG. 1).

In some embodiments, calculating an improved updated price can be done using a Newton-direction-based iteration. For example, the disutility for a given participant may be modeled with a quadratic function of temperature around the preferred temperature in their home, and the temperature of this participant's home may be modeled using a linear thermodynamic model. In this case, using Newtown's method, the aggregation technique may converge in one pass, i.e., a subsequent iteration may not be needed.

Additionally, in some embodiments, participants 114 (FIG. 1) respond with supply-function approximations that approximate their supply function proximate to the current probe price and at future prices. In this case, the aggregation technique described can be used to plan and price a sequence of future transactions (i.e., to compute a temporal price schedule). Therefore, the initial estimated price may be generalized to a vector of prices for the present and future time intervals, and the supply-function approximations may indicate the willingness of participants 114 (FIG. 1) to provide supply in the present and future time intervals. Thus, the given supply-function approximation may be a vector-valued function of the price vector. In a variation on these embodiments, only the supply for the current time interval is executed, and the aggregation technique may be repeated in the very next time interval, thereby implementing a model predictive control method of the pricing and the aggregation of supply.

In some embodiments, the supply-function approximations are communicated in the form of models (e.g., differential equations) or computational agents (e.g., in the form of mobile code) that aggregator 112 (FIG. 1) can use to project future supply availability and pricing. When these kinds of supply-function approximations are provided to aggregator 112 (FIG. 1), the calculated updated price may vary (e.g., aggregator 112 in FIG. 1 may need to solve multiple differential equations or may need to search to find an optimal price). However, in other respects, the basic structure of the embedded economic mechanism may be unchanged. Because of the potential computation complexity when calculating the updated price, it may be beneficial to place restrictions on the models (e.g., only first-order differential equations or only Markov models), or restrictions on the computation agents (e.g., only agents that are table-driven finite state machines).

Note that the preceding embodiments, which include future prices and future supply, may be particularly relevant to demand-response applications where the future behavior of participants 114 (FIG. 1) is affected by current demand-response actions. Participants 114 (FIG. 1) and aggregator 112 (FIG. 1) may benefit from the planning allowed by these embodiments of the aggregation technique. In particular, the aggregation technique may compensate for the cumulative effect of the demand response during a sequence of time intervals. Moreover, because the size and complexity of the supply functions of participants 114 (FIG. 1) may increase when future time intervals are included in the optimizations, the compact supply-function approximations may allow rapid convergence to solutions to demand-response aggregation.

As noted previously, the aggregation technique may allow independent optimizations to occur in system 100 (FIG. 1) with limited inter-party information. In particular, a given participant i may try to identify $p_i$ that minimizes the disutility versus reward, i.e., that minimizes the function $$U_i(x_i(p_i,\lambda)) - \lambda \cdot x_i(p_i,\lambda),$$

where $\lambda$ is a market price, $p_i$ is a parameter bid of the given participant, $x_i$ is a supply-function approximation of the given participant, and $U_i$ is a cost or disutility function of the given participant. Similarly, in order to supply C units of the energy service from N participants 114 (FIG. 1), aggregator 112 (FIG. 1) attempts to find the minimum price $\lambda$ such that his total cost $C \cdot \lambda$ is minimized, subject to the total supply summing to C:

$$\sum_{i=1}^{N} x_i(p_i, \lambda) = C.$$

In addition, ISO 110 (FIG. 1) attempts to obtain the C units of supply while incurring the minimum total disutility or by minimizing $$\sum_{i=1}^{N} U_i(x_i(p_i, \lambda))$$

such that $$\sum_{i=1}^{N} x_i = C.$$

In an exemplary embodiment, the given participant determines the disutility function $U_i$ by mapping their discomfort to a temperature and mapping the temperature in their home to a corresponding power (or demand response). Assume that for a given price, the participants will respond with a supply which minimizes the tradeoff between their disutility and their revenue. In this case, the participants can directly relate their supply functions to their disutility functions:

$$x_i^*(\lambda) = \operatorname*{argmin}_{x_i}\{U_i(x_i) - \lambda x_i\}.$$

However, the aggregator does not know the exact disutility functions or the exact supply functions. Instead, the aggregator may broadcasts a price signal $\lambda$ to the participants, and the participants may respond with tangent supply function approximations $$x_i(\lambda) = \beta_i + \alpha_i \lambda,$$

which are parameterized by the slope $\alpha$ and intercept $\beta$. Then, applying a Newton-based primal-dual method (as described in "Nonlinear Programming" by Bertsekas), and substituting the parameterization above for $x_i$, we obtain the following iterations for the parameters $$\alpha_i^{(k+1)} = x_i^{(k)} - \frac{\frac{\partial U_i(x_i^{(k)})}{\partial x_i}}{\frac{\partial^2 U_i(x_i^{(k)})}{\partial x_i^2}}$$

$$\beta_i^{(k+1)} = \frac{1}{\frac{\partial^2 U_i(x_i^{(k)})}{\partial x_i^2}}$$

$$\lambda^{(k+1)} = \frac{C - \sum_{i=1}^{N_{cons}} \alpha_i^{(k+1)}}{\sum_{i=1}^{N_{cons}} \beta_i^{(k+1)}}.$$

The $(\alpha,\beta)$-iterations may be used by the participants to update their parameters for the next iteration, and the $\lambda$-iteration may be used by the aggregator to update his price at the next iteration. Under certain technical assumptions, these iterations yield a sequence of improving prices, along with supplies that sum up to the required aggregate of C, which simultaneously: minimize the total disutility, optimize the individual tradeoffs of the participants, and minimize the cost to the aggregator of eliciting a total response of size C from the participants.

In the multiple time-increment case, a dynamical model can be used to capture the future effects of current responses. As a specific example, consider the following linear approximate thermodynamic model of the time evolution of temperature in a home $$T_{i,t+1} = T_{i,t} + a_i(T_{out} - T_{i,t}) - b_i(P_{base,i} - x_{i,t})$$

as a function of outside temperature $T_{out}$ and base power $P_{base,i}$ where $a_i$ and $b_i$ are the thermal loss and input gain, respectively. By iterating this recursion, one can obtain an expression for the temperature as a function of just the responses $x_{i,t}$, and hence the disutility function, which is assumed to be a power law function of the temperature deviation from some desired setpoint ($T^*_i$) of participant i at time j, and which can also be written as a function of just the responses $x_{i,t}$:

$$U_{i,t}(x_{i,1} \ldots x_{i,t}) = c_i|(x_{i,1} \ldots x_{i,t} - x_{i,t}) - T^*_i|^n$$

The resulting multiple time-increment optimization problem then becomes $$\min_{x} \sum_{i=1}^{N_{cons}} \sum_{t=1}^{N_T} U_{i,t}(x_{i,1} \ldots x_{i,t})$$

$$s.t. \sum_{i=1}^{N_{cons}} x_{i,t} = C_t, t \in \{1 \ldots N_T\}$$

for which one can obtain analogous, albeit more complicated, expressions for the iterations of the parameters of affine (multivariable) supply function approximations. In a model predictive control implementation, the optimization problem above can be solved at each time increment, with the time indexes advanced by one each time, and where only the first responses in time are executed at each time increment.

Note that in the aggregation technique, aggregator 112 (FIG. 1) may probe participants 114 (FIG. 1) by broadcasting prices and observing responses. This approach is analogous to the way an optimization technique probes objective functions by evaluating gradients and Hessians.

Figure 4:
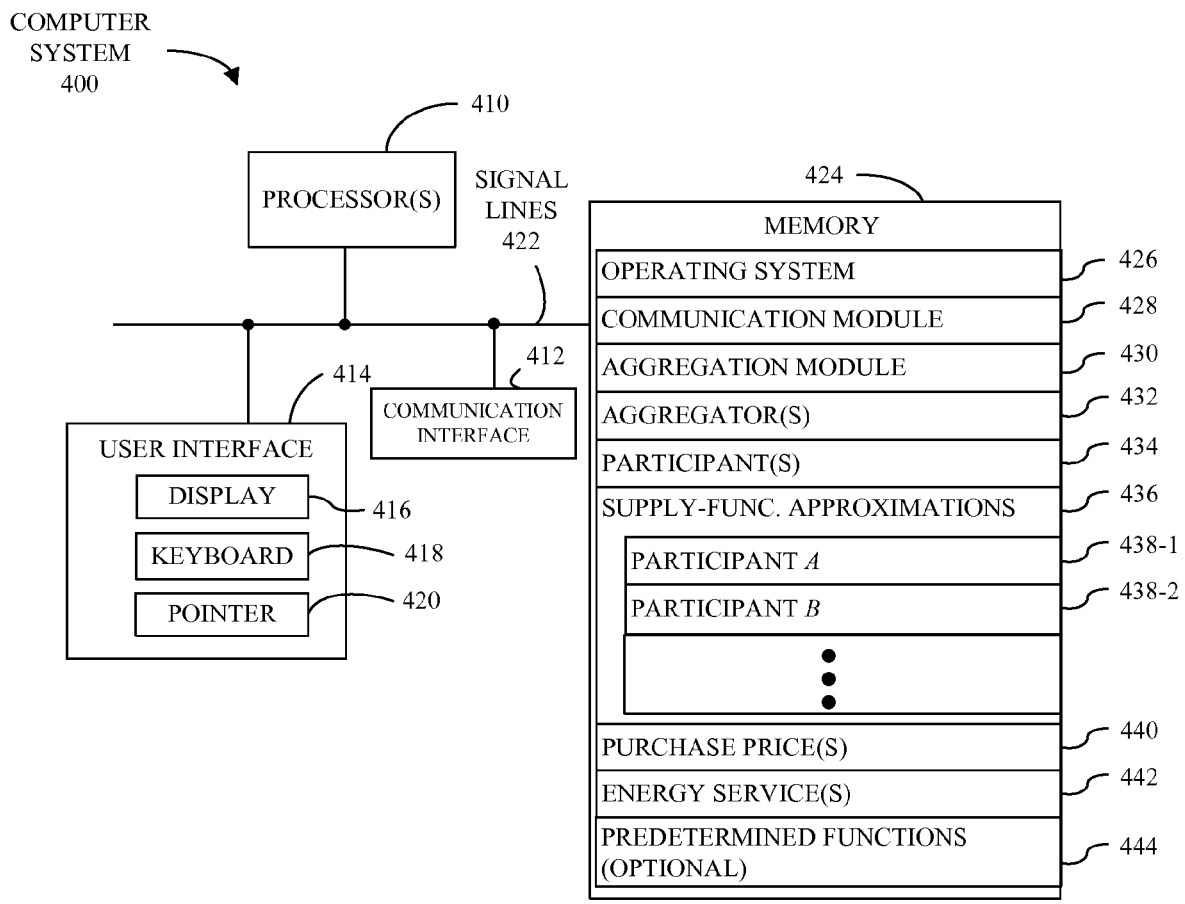
FIG. 4 is a block diagram illustrating a computer system in accordance with an embodiment of the present disclosure.

We now describe embodiments of a computer system that performs process 200. FIG. 4 presents a block diagram illustrating a computer system 400. Computer system 400 includes: one or more processors 410, a communication interface 412, a user interface 414, and one or more signal lines 422 coupling these components together. Note that the one or more processing units 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in the computer system 400 may include volatile memory and/or non-volatile memory. More specifically, memory 424 may include: ROM, RAM, EPROM, EEPROM, flash, one or more smart cards, one or more magnetic disc storage devices, and/or one or more optical storage devices. Memory 424 may store an operating system 426 that includes procedures (or a set of instructions) for handling various basic system services for performing hardware-dependent tasks. In some embodiments, the operating system 426 is a real-time operating system. Memory 424 may also store communication procedures (or a set of instructions) in a communication module 428. These communication procedures may be used for communicating with one or more computers, devices and/or servers, including computers, devices and/or servers that are remotely located with respect to the computer system 400.

Memory 424 may also include multiple program modules (or sets of instructions), including aggregation module 430 (or a set of instructions). Aggregation module 430 may aggregate one or more participants 434 on behalf of one or more aggregators 432 to provide one or more aggregate energy services 442. In particular, aggregation module 430 may provide one or more probe prices, and may receive one or more supply-function approximations 436 from participants 434, such as a supply-function approximation from participant A 438-1 or a supply-function approximation from participant B 438-2. In some embodiments, participants 434 select current supply-function approximations for the probe price in a current time interval from an optional set of predetermined functions 444.

Then, aggregation module 430 may use the one or more supply-function approximations 436 to calculate one or more purchase prices 440 in the current time interval or in a sequence of time intervals. If necessary, aggregation module 430 may repeatedly iterate this aggregation process until at least one of purchase prices 440 approximately converges with the probe price for an iteration.

Instructions in the various modules in memory 424 may be implemented in: a high-level procedural language, an object-oriented programming language, and/or in an assembly or machine language. This programming language may be compiled or interpreted, i.e., configurable or configured, to be executed by the one or more processing units 410.

Although computer system 400 is illustrated as having a number of discrete items, FIG. 4 is intended to be a functional description of the various features that may be present in computer system 400 rather than a structural schematic of the embodiments described herein. In practice, and as recognized by those of ordinary skill in the art, the functions of the computer system 400 may be distributed over a large number of devices or computers, with various groups of the devices or computers performing particular subsets of the functions. In some embodiments, some or all of the functionality of computer system 400 may be implemented in one or more application-specific integrated circuits (ASICs) and/or one or more digital signal processors (DSPs).

In some embodiments, system 100 (FIG. 1) and/or computer system 400 include fewer or additional components. Moreover, two or more components may be combined into a single component and/or a position of one or more components may be changed. Moreover, the functionality of system 100 (FIG. 1) and/or computer system 400 may be implemented more in hardware and less in software, or less in hardware and more in software, as is known in the art.

Figure 5:
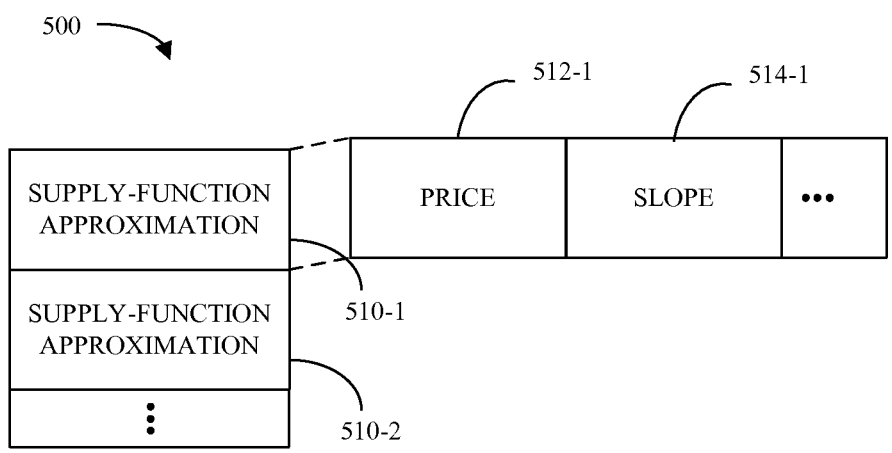
FIG. 5 is a block diagram illustrating a data structure in accordance with an embodiment of the present disclosure.

We now discuss data structures that may be used in computer system 400. FIG. 5 presents a block diagram illustrating a data structure 500. This data structure may contain supply-function approximations 510 for one or more participants. For example, supply-function approximation 510-1 may include one or more pairs of a price and a corresponding slope of (or tangent to) a supply-function approximation, such as price 512-1 and slope 514-1.

In some embodiments, data structure 500 includes fewer or additional components. Moreover, two or more components may be combined into a single component and/or a position of one or more components may be changed.

While the preceding embodiments illustrate the use of the aggregation technique to provide an aggregate energy service, in other embodiments this technique may be used in a wide variety of problems to provide a market-based mechanism or economic exchange to rapidly determine a local equilibrium between price and supply between numerous distinct organizations or individuals.

The foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art. Additionally, the above disclosure is not intended to limit the present disclosure. The scope of the present disclosure is defined by the appended claims.

What is claimed is:

1. A method for aggregating an energy service from a number of participants for use by a power-system operator, comprising:

estimating, by a computer, a probe price to elicit energy service from one or more participants;

providing the probe price to a respective participant in a group of participants;

receiving, from the respective participant, a supply-function approximation that includes a slope, $\alpha$, and an intercept, $\beta$, to map a price of the energy service to a supply amount that the respective participant can provide;

calculating, by the computer, a purchase price, $\lambda$, for the group of participants of the energy service using the function:

$$\lambda = \frac{C - \sum_{i=1}^{N_{cons}} \alpha_i}{\sum_{i=1}^{N_{cons}} \beta_i},$$

wherein C indicates a total supply quantity, and i iterates over N participants in the group of participants;

responsive to the purchase price not being approximately equal to the probe price:

sending, to a respective participant, an updated probe price that includes the purchase price;

receiving an updated supply function approximation from the respective participant; and recalculating the purchase price using the updated supply function approximation; and responsive to the purchase price being approximately equal to the probe price, providing the purchase price to the participants.

2. The method of claim 1, further comprising providing a bid to the power-system operator to provide the desired amount of energy service at a contracted time in the future.

3. The method of claim 2, wherein the operations of providing the probe price, receiving the supply-function approximations, and generating the purchase price occur after the bid and before the contracted time.

4. The method of claim 1, wherein determining whether the purchase price approximately equals the probe price includes determining whether the purchase price meets restrictions included in the supply-function approximation.

5. The method of claim 1, wherein the purchase price is a minimum price in a range of prices.

6. The method of claim 1, wherein the energy service includes at least one of: a demand response in which the participants agree to reduce energy demand, a commitment by the participants to provide power, and a commitment by the participants to provide ancillary power services.

7. The method of claim 1, wherein aggregating the energy service facilitates regulation of a power system by the power-system operator.

8. The method of claim 7, wherein the regulation occurs over a time interval that is less than 15 seconds.

9. The method of claim 1, wherein aggregating the energy service facilitates load following in a power system by the power-system operator.

10. The method of claim 9, wherein the load following occurs over a time interval that is less than one minute.

11. The method of claim 1, wherein generating the purchase price involves performing Newton's method based at least in part on the supply-function approximation.

12. The method of claim 1, wherein, after generation of the purchase price, the purchase price is fixed for the participant, who is obliged to provide a corresponding portion of the desired amount of the energy service.

13. The method of claim 1, wherein the supply-function approximation includes a restriction on a binding responsibility of the participant.

14. The method of claim 1, wherein the supply-function approximation includes a tangent to the supply function at the probe price.

15. The method of claim 1, wherein the supply-function approximation is a vector that includes a series of supply-function approximations and associated prices that facilitate calculation of purchase prices in a sequence of time intervals.

16. The method of claim 15, wherein a dynamical model is used to compute future effects of demand responses on the participant over time.

17. The method of claim 15, where the supply function approximations are used in a model predictive control implementation.

18. The method of claim 1, wherein the supply-function approximation includes at least one of: a difference equation, a differential equation and a finite state machine.

19. The method of claim 1, wherein the supply-function approximation is selected from a set of predetermined functions.

20. The method of claim 1, further comprising coupling the energy service with other power sources or other power loads.

21. The method of claim 1, wherein generating the purchase price further involves minimizing a cost or disutility function of the participant.

22. A computer-program product for use in conjunction with a computer system, the computer-program product comprising a non-transitory computer-readable storage medium and a computer-program mechanism embedded therein to aggregate an energy service from a number of participants for use by a power-system operator, the computer-program mechanism including:

instructions for estimating a probe price to elicit energy service from one or more participants;

instructions for providing the probe price to a respective participant in a group of participants;

instructions for receiving, from the respective participant, a supply-function approximation that includes a slope, $\alpha$, and an intercept, $\beta$, to map a price of the energy service to a supply amount that the respective participant can provide;

instructions for calculating a purchase price, $\lambda$, the group of participants of the energy service using the function:

$$\lambda = \frac{C - \sum_{i=1}^{N_{cons}} \alpha_i}{\sum_{i=1}^{N_{cons}} \beta_i},$$

wherein C indicates a total supply quantity, and i iterates over N participants in the group of participants;

instructions for recalculating the purchase price responsive to the purchase price not being approximately equal to the probe price, wherein recalculating the purchase price involves:

sending, to a respective participant, an updated probe price that includes the purchase price;
receiving an updated supply function approximation from the respective participant; and
recalculating the purchase price using the updated supply function approximation; and instructions for providing the purchase price to the participants responsive to the purchase price being approximately equal to the probe price.

23. A computer system, comprising:
a processor;
memory; and
a program module, wherein the program module is stored in the memory and configured to be executed by the processor, the program module to aggregate an energy service from a number of participants for use by a power-system operator, the program module including:
instructions for estimating a probe price to elicit energy service from one or more participants;
instructions for providing the probe price to a respective participant in a group of participants;
instructions for receiving, from the respective participant, a supply-function approximation that includes a slope, $\alpha$, and an intercept, $\beta$, to map a price of the energy service to a supply amount that the respective participant can provide;
instructions for calculating a purchase price, $\lambda$, for the group of participants of the energy service using the function:

$$\lambda = \frac{C - \sum_{i=1}^{N_{cons}} \alpha_i}{\sum_{i=1}^{N_{cons}} \beta_i},$$

wherein C indicates a total supply quantity, and i iterates over N participants in the group of participants;
instructions for recalculating the purchase price responsive to the purchase price not being approximately equal to the probe price, wherein recalculating the purchase price involves:
sending, to a respective participant, an updated probe price that includes the purchase price;
receiving an updated supply function approximation from the respective participant; and
recalculating the purchase price using the updated supply function approximation; and
instructions for providing the purchase price to the participants responsive to the purchase price being approximately equal to the probe price.

\* \* \* \* \*